United States Patent [19]
Koblenz et al.

[11] Patent Number: 5,530,866
[45] Date of Patent: Jun. 25, 1996

[54] REGISTER ALLOCATION METHODS HAVING UPWARD PASS FOR DETERMINING AND PROPAGATING VARIABLE USAGE INFORMATION AND DOWNWARD PASS FOR BINDING; BOTH PASSES UTILIZING INTERFERENCE GRAPHS VIA COLORING

[75] Inventors: Brian D. Koblenz, Seattle; Charles D. Callahan, II, Mercer Island, both of Wash.

[73] Assignee: Tera Computer Company, Seattle, Wash.

[21] Appl. No.: 324,152

[22] Filed: Oct. 13, 1994

Related U.S. Application Data

[63] Continuation of Ser. No. 200,355, Feb. 22, 1994, which is a continuation of Ser. No. 738,846, Jul. 30, 1991.

[51] Int. Cl.$^6$ .................................................. G06F 12/00
[52] U.S. Cl. .............................. 395/700; 364/DIG. 1; 364/280; 364/280.4; 364/280.5; 364/281.6; 395/375
[58] Field of Search ................................ 395/700, 375; 364/280, 280.4, 280.5, 281.6

[56] References Cited

U.S. PATENT DOCUMENTS

| | | | |
|---|---|---|---|
| 4,229,790 | 10/1980 | Gilliland et al. | 364/200 |
| 4,571,678 | 2/1986 | Chaitin | 364/200 |
| 4,656,582 | 4/1987 | Chaitin et al. | 364/200 |
| 4,782,444 | 11/1988 | Munshi et al. | 364/300 |
| 4,791,558 | 12/1988 | Chaitin et al. | 364/200 |
| 5,249,295 | 9/1993 | Briggs et al. | 395/650 |
| 5,428,793 | 6/1995 | Odnert et al. | 375/200 |

OTHER PUBLICATIONS

"Register Allocation & Spilling Via Graph Coloring," G. J. Chaitin, Proceedings of the ACM, May 1982, pp. 98–105.

"Register Allocation by Priority–based Coloring," Frederich Chow and John Hennesey, Proceedings of the ACM SIGPLAN on Compiler Construction, SIGPLAN Notices vol. 19, No. 6, Jun. 1984, pp. 222–232.

"Coloring Heuristics for Register Allocation," Preston Briggs et al., Proceedings of the ACM SIGPLAN 89 Conference on Program Language Design and Implementation, Jun. 1989, pp. 275–284.

"Register Allocation via Tiling," David Callahan and Brian Koblenz, Tera Computer Company, Aug. 12, 1990.

"Aggressive Live Range Splitting," Preston Briggs et al., Rice University Technical Report, 1991.

Callahan, et al.; "Register Allocation Via Hierarchial Graph Coloring"; Proceedings of the ACM SIGPLAN '91; 1991.

Callahan, et al.; "Register Allocation Via Tiling"; Tera Computer Co.; 1990.

Steenkoste, P; "Lisp on a Reduced–Instruction–Set Processor: Characterization & Optimization"; PhD Thesis; Stamford University; 1987.

Wah, David; "Global Register Allocation at Life Time"; DEC Corp.

Aho, et al.; *Compiles Principles, Techniques, and Tools*; Addison–Wesley, 1986, pp. 528–546.

Chaitlin, Gregory, et al.; *Register Allocation Vren Coloring*; Computer Languages, vol. 6; Pergamon Press Limited, 1981, pp. 47–57.

*Primary Examiner*—Alvin E. Oberley
*Assistant Examiner*—Jonathan Hall Backenstose
*Attorney, Agent, or Firm*—Stoel Rives

[57] ABSTRACT

The present invention provides methods for allocating physical registers within a compiler phase to achieve efficient operation of a target CPU. The methods of the present invention allocate variables between physical registers and memory to accommodate local as well as global code structure. Such methods facilitate the location of variables that are heavily accessed at a portion of the code in a physical register during the execution thereof.

34 Claims, 3 Drawing Sheets

REGISTER ALLOCATION METHODS HAVING UPWARD PASS FOR DETERMINING AND PROPAGATING VARIABLE USAGE INFORMATION AND DOWNWARD PASS FOR BINDING; BOTH PASSES UTILIZING INTERFERENCE GRAPHS VIA COLORING

RELATED APPLICATIONS

This is a continuation application of application Ser. No. 08/200,355, filed Feb. 22, 1994, which is a continuation of application Ser. No. 07/738,846, filed Jul. 30, 1991.

TECHNICAL FIELD

The present invention relates to methods for allocating variables to physical registers in a compiler phase to provide enhanced compiler function and efficient code execution. More specifically, the present invention relates to a method of determining which variables contained in the code being compiled to spill and where to insert spill code therefor to produce an optimized global physical register allocation with local referents.

BACKGROUND OF THE INVENTION

Compilers, particularly optimizing compilers, facilitate efficient communication between the user/programmer and the target central processing unit (CPU). The function of a compiler is to convert code written in a high level programming language containing instructions into machine readable form, allowing those instructions to be carried out efficiently by a target CPU. Ideally, the higher level language code and the compiled, machine readable code are directed to the same set of instructions, with the machine readable code being an efficient (i.e., optimized) rendition thereof.

Optimization techniques used by prior art compilers include a register allocation step. Target CPUs have a limited number of physical registers. The number of physical registers is generally small, and only one value may occupy a physical register a time. Variables defined and utilized in program code are allocated between these physical registers and CPU memory by a phase in a compiler. Register allocation is therefore a type of resource management that may be used to enhance the efficiency of target CPU functioning. Such enhancement occurs when the most heavily accessed variables of the code are placed in physical registers.

The input variables, output variables and other variables used in certain types of operations are required by certain target CPUs to be located in physical registers. For example, a load/store CPU design requires that mathematical operations, for example, be conducted in this manner, with only loads and stores proceeding directly from/to memory.

A mathematical expression to be carried out by a load/store target CPU might be represented as follows:

$C=A+B$

In order for a target CPU to carry out this operation, variables A and B would have to reside in different physical register locations at the same time. Two physical registers would therefore have to be simultaneously available to accommodate this operation. If only one register is available at the time that this operation is to be carried out, a variable resident in a second register must be "spilled" into memory to allow the second variable involved in the operation to be allocated to that register. The choice of the particular variable to spill, when a spill is required, is an important one with respect to target CPU efficiency in carrying out code instructions.

One method of allocating registers is disclosed in U.S. Pat. No. 4,571,678 issued to Chaitin, entitled "Register Allocation and Spilling via Graph Coloring." In this approach, techniques used in graph coloring are applied to the register allocation problem, with certain modifications that allow a global spill analysis to be conducted. To accomplish physical register allocation, each variable (or set of coalesced variables as described below) is represented as a node in an interference graph. In addition, each physical register is associated with a different color.

Variables that are "live" at the same time (e.g., variables A and B in the mathematical operation set forth above) are designated as conflicting and cannot occupy the same physical register. Nodes representing conflicting variables are connected with an "edge" in an interference graph, thereby graphically indicating that the conflicting variables represented by the connected nodes cannot reside in the same physical register. As a result, the register allocation problem becomes one of coloring the interference graph such that conflicting nodes receive a different color. This goal is relatively simple to achieve when no variable has a number of conflicts greater than or equal to the number of physical registers.

When one or more variables have a number of conflicts exceeding the number of physical registers available to the target CPU, a decision must be made as to which variables will be placed in registers and which will be "spilled" into memory. According to the Chaitin patent, processes using graph coloring prior to that patent abandoned the graph coloring technique at the spill decision stage in favor of other ad hoc methodologies.

Chaitin, in U.S. Pat. No. 4,571,678, extended the application of graph coloring principles to global spill analysis. In this prior art process, an interference graph encompassing the whole of the program code under analysis is generated. This complete code interference graph is constructed using a dual variable representation involving a bit matrix and adjacency vectors. For code containing N variables, an N×N bit matrix is constructed, with each row I/column J location within the matrix receiving a value of 1 if the nodes I and J are adjacent (i.e., represent conflicting variables). The adjacency vector for each node reflects the set of nodes that are adjacent thereto. Specifically, the length of the adjacency vector indicates the degree (i.e., number of conflicting nodes) of each node in the interference graph.

A two step methodology is used to generate the complete code interference graph to be used in the coloring register allocation process. The first step involves the use of the bit matrix to calculate the degree of each node. Adjacency vectors are allocated storage for each node, and the second step of filling in the adjacency vectors is undertaken.

Certain variables are related to each other in a manner allowing them to occupy the same physical register. For example, nodes corresponding to related variables which are the source and target of copy operations (e.g., A=B) may be coalesced, provided that the nodes do not otherwise conflict. Coalesced nodes will be assigned the same color, and the individual variables corresponding to those nodes will be assigned to the same physical register. These related variables are identified and coalesced, and a modified interference graph is constructed. At this time, the bit matrix is updated to reflect the node combinations, and the adjacency vectors of the coalesced nodes are added together.

If the interference graph, modified to reflect the coalesced variables, exhibits a number of nodes that is less than the number of physical registers available to the target CPU, straight-forward register allocation can proceed. If not, spill decisions must be made.

Register allocation proceeds as follows. All nodes along with their edges having a number of conflicts less than the number of physical registers are serially eliminated from the interference graph. This process is referred to in the prior art patent as graph reduction. In a situation involving code for which no spill decisions need be made, all of the nodes in the interference graph are eliminated in this manner. If elimination of all the nodes occurs, the nodes are allocated colors in the reverse order of elimination.

When all of the nodes having a number of conflicts less than the number of physical registers have been removed from the interference graph, a decision must be made with respect to the next variable to eliminate. The chosen variable will be spilled to memory. Preferably, the next variable eliminated will have a cascading effect by decreasing the number of conflicts to generate additional nodes with a number of conflicts less than the number of physical registers. In this manner, a number of additional nodes may be removed from the interference graph through the use of the graph reduction methodology discussed above.

To make a spill decision in accordance with the prior art patent, a spill cost is determined for each variable (individual and coalesced) having a number of conflicts that exceeds the number of physical registers. In other words, a spill cost is determined for each node in an interference graph having a number of adjacent/connected nodes greater than the number of physical registers. This spill cost computation is based upon an estimate of the increase in program execution time resulting from the spill of that variable, which necessitates a memory reference whenever the spilled variable is required to reside in a physical register during code execution.

The prior art spill cost estimate equals the number of definition points for the variable plus the number of uses of the variable, with each definition and use weighted by an estimated execution frequency therefor. In this weighting process, all instructions are assumed to be executed in one cycle, and each instruction contained in a loop is estimated to be executed ten more times than it would be if located outside the loop. Local program code structure is not examined more specifically (e.g., with respect to interconnectedness or relative location of the structural features) in this prior art process.

The node having the smallest spill cost/number of conflicts value is selected for elimination from the interference graph. Once this variable is eliminated, the register allocation procedure continues, with an examination of each node to determine whether the number of conflicts is less than the number of physical registers.

Certain rules are employed to provide some local information to the prior art global allocation procedure. First, if a spilled parameter is used several times and no variables go dead within a basic code block, only one memory reference is necessary for that spilled variable, because it may reside in the allocated register throughout the basic block. Also, if a variable is local to a basic block (i.e., it appears nowhere else in the code), and no variable goes dead between the local variable definition and last use, elimination of that local variable cannot simplify the register allocation process. As a result, the spill cost of that local variable is set to infinity.

In addition to the decision with respect to which variables to spill, the location of the code necessary to accomplish the spill operations must be determined. The prior art patent involves insertion of spill code at each of the definition points of the variable to be spilled and a memory reference at each use point of that variable, with the exception of the basic block situation discussed above. As a result, this methodology is generally global in scope, with variables primarily allocated to physical registers or memory over the entire program.

After the spill code is inserted, an interference graph reflecting the spill decisions is constructed to insure that the entire coloring procedure can be conducted. If not, the register allocation procedure must be undertaken again, inserting additional spill code. Convergence of this iterative procedure is generally rapid and the interference graph for each iteration is smaller than that of the previous iteration.

SUMMARY OF THE INVENTION

The present invention provides methods for allocating physical registers within a compiler phase to achieve efficient operation of a target CPU. Proper physical register allocation during translation of higher language program code into machine readable form permits a target CPU to conduct the tasks required by the programming code efficiently.

The methods of the present invention allocate variables between physical registers and memory to accommodate local as well as global program code structure. In other words, the methods of the present invention facilitate the location of a variable to a physical register during periods of heavy access of that variable.

The methods of the present invention involve a construction of a tree corresponding to the hierarchial program structure, a bottom-up processing phase (FIG. 2a) over the tree where the decision with respect to which variable(s) to spill is and a top-down processing phase over the tree (FIG. 2b) where the location of the spill code is chosen. Prior to the bottom-up phase, a tile tree is constructed reflecting the structure of the code upon which it is based. For each tile, an interference graph indicating the conflicting variables in a segment of program code and the preferences of certain variables for registers is constructed and colored with pseudo registers. The tile interference graph coloring is summarized and passed up the tile tree for use in generating interference graphs for parent tiles. During the top-down phase, the information generated during the first phase and some additional information regarding the code being compiled is used to map the pseudo registers to physical registers. In addition, the location(s) for insertion of spill code are identified, and the spill code insertions are made.

Among others, the methods of the present invention garner the advantages of efficient target CPU functioning, smaller interference graph generation, compile time savings, and profiling data incorporation ease.

DETAILED DESCRIPTION OF THE PREFERRED EMBODIMENTS

Figure 1A:
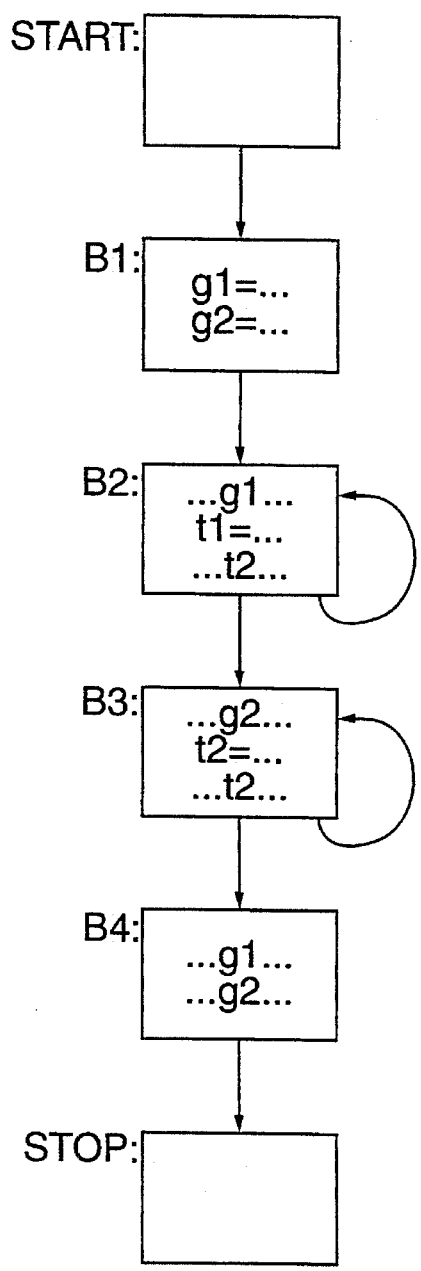
FIG. 1a is a schematic representation of program code to be compiled in accordance with the present invention.

Definitions of terms, as used in the following description, are presented below to facilitate the understanding of the present invention.

Code: A set of instructions to be carried out by a target CPU that is written in a higher level programming language. The set of instructions may constitute a complete program, a routine, a subroutine or any other increment that is compiled separate and apart from other code.

Basic Block: A basic structural unit of code within which no transfers of control are located. For example, a block may be a single statement or a group of closely related statements.

Control Flow Graph: A representation of code structure, characterized by a set of basic blocks and a set of control flow edges between those blocks. A start block (a block with no precursors) and a stop block (a block with no successors) bound the set of basic blocks of the control flow graph.

Interval: A set of basic blocks identified on the control flow graph that form a loop in the code. Loop tops or summary loop tops (for irreducible loops) as well as loop exits or summary loop exits (for loops with multiple exits) bound intervals. Each interval is preferably further analyzed to capture control structure contained therein in the formation of a tile tree.

Tile: A set of blocks corresponding to a portion of code constituting a loop or a conditional structure. For example, a FOR loop or a THEN conditional statement within a program is represented by a tile.

Tile Tree: A structure of tiles representing the loop and conditional structure of the code under analysis. Nested loops, for example, are represented hierarchically as ancestor (outer loops) and descendant (inner loops) tiles. Descendant tiles are sometimes referred to in this description as child tiles or subtiles. Each branch of a conditional statement, for example, is represented by a sibling the (tiles of equal hierarchical stature within the tile tree). The interrelationships between individual tiles forming the tile tree incorporate global and local structure of the code under analysis.

Leaf Tile: A tile with no descendants.

Bottom-Up Processing: A processing phase that begins with an analysis of a leaf tile (e.g., the inner loop in a nested loop structure) and proceeds upward to perform a preliminary pseudo register allocation based on local variable usage. This process culminates with the root tile, the tile containing the start and stop blocks.

Top-Down Processing: A processing phase that begins with an analysis of the most senior tile (e.g., the root tile and then tiles such as the outer loop in a nested loop structure) and proceeds downward to provide a global perspective to the register allocation operation and insert spill code where needed.

Pseudo Register: A non-physical register to which variables are initially assigned during the first, bottom-up step of the process of the present invention. The pseudo register allocation of variables is characterized by primarily local referents. Each pseudo register will ultimately be bound to a physical register, and the number of pseudo registers are therefore limited to the number of physical registers.

Physical Register: A register that is an actual, physical location available to the target CPU for variable storage. Physical registers are limited in number, and variable allocation thereto is therefore important to the efficiency of code execution. Variables that are allocated to pseudo registers during the bottom-up phase of the process of the present invention are bound to physical registers during the second, top-down phase of the process.

Live Variable: A variable that has been defined and has not gone dead. More specifically, a variable is live at a point in the code, where it holds a value which may subsequently be used.

Local Variable: A variable referenced only within a the is local to that tile.

Global Variable: A variable referenced in a tile, but not local to the tile, is global with respect to that tile.

Tile Summary Variable: A variable created after the first, bottom-up phase of the process of the present invention is conducted for each tile. The tile is summarized by creating one new variable for each distinct register to which a local variable is allocated therein. This information is passed upward in the tile tree in bottom-up processing of a parent tile.

Interference Graph: A graph generated for a tile, including a node corresponding to each variable referenced in the tile and (during the bottom-up phase) tile summary variables for each child the of that tile. These interference graphs are the bases upon which variable allocation to pseudo registers is made.

Conflict: A conflict, represented by an edge between variables in an interference graph, exists when more than one variable is live at the same time. Variables that conflict may not occupy the same physical register.

Coloring: A heuristic based on available information is utilized to assign a color to the nodes on an interference graph for each tile, with adjustments made for preferences and other aspects of the present invention.

Preference: An indication of the desirability of allocating a variable to a specific register or different variables to the same register. For example, if some reason exists for a variable to reside in a specific physical register, the variable will be preferenced to that register.

Spill: In general, a variable is spilled when it has a number of conflicting variables exceeding the number of physical registers, and its spill cost is lower than that of other variables having an excessive number of conflicts. With reference to the general rules of spill code insertion and when a global variable is assigned to a register in a parent tile and to memory in a child tile, a register to memory transfer is inserted on each entry edge of the child tile where that variable is live. Also, spills may occur on exit edges of child tiles when the variable is allocated to memory in the parent tile and a register in the child tile.

Transfer: With reference to the general rules of spill code insertion and when a global variable is assigned to a register in a parent tile and is assigned to a different register in a child tile, a register move (i.e., a register to register transfer) is employed at each entry edge and each exit edge of the child tile where the variable is live.

Reload: With reference to the general rule of spill code insertion and when a parent tile spills a variable to memory that is assigned a register in a child tile, and it is cost effective to reload that variable, a memory to register transfer is inserted on each entry edge of the child tile where that variable is live. Also, reloads may occur on exit edges of child tiles when the variable is allocated to a register in the parent tile and to memory in the child tile.

No Change: With reference to the general rules of spill code insertion and when both the parent and child tiles allocate the variable to memory (or to the same physical register), no processing is necessary, because the variable is associated with a single location in memory (or with the same physical register).

The present invention provides a process that is capable of allocating variables located in user-generated program code between physical registers and memory available to a target CPU. CPUs have a limited number of physical registers, e.g., about 32. For program code having a large number of variables, a physical register cannot be provided for each variable.

In the practice of the present invention, the loop and conditional structure of the program code under analysis is represented by a tile tree. Each tile in the tile tree is processed in a bottom-up fashion, creating a local interference graph. This local interference graph is colored using pseudo registers, with the local spill decisions made on the basis of local variable usage. A summary of the local interference graph (including pseudo register allocations and spill decisions) is communicated to a parent tile, located higher in the tile tree. The entire the tree is processed in this stepwise manner to allocate variables to pseudo registers based upon local variable usage.

A top-down process phase is next employed to bind the pseudo registers to physical registers. This step serves to provide a global overview to the local variable allocation performed in the bottom-up step. Spill code is inserted during the top-down process step to accommodate the spill decisions, but not necessarily at the point where the spill decision was made.

A program containing code to be processed in accordance with the present invention may be represented by a control flow graph G=(B,E,start,stop). For this implementation, B represents a set of basic code blocks, and E represents a set of control flow edges between elements of B. "Start" is the unique block with no predecessors, and "stop" is the unique block with no successors. T, a tile tree, may now be defined as a collection of sets of basic blocks encompassing the entire set B. Each element of T, t, constitutes a tile if the following conditions hold:

(1) Each pair of sets t in T are either disjoint or one is a proper subset of the other. If $t_2 \epsilon t_1$ and there is no $t \epsilon T$ such that $t_2 \epsilon t \epsilon t_1$, then $t_2$ is a child tile or subtile of $t_1$ and $t_1$ is the parent tile of $t_2$, denoted $t_1$=parent($t_2$). The set blocks(t) is defined to be the set of basic blocks that are members of t but are not members of any child of t.

(2) For each edge e=(n,m)$\epsilon$E and tile t such that m$\epsilon$t, either n$\epsilon$t or n$\epsilon$ blocks(parent(t)). If n$\epsilon$ blocks-(parent(t)), e is an entry edge.

(3) For each edge e=(m,n)$\epsilon$E and tile t such that m$\epsilon$t, either n$\epsilon$t or n$\epsilon$ blocks(parent(t)). If n$\epsilon$ blocks-(parent(t)), e is an exit edge.

(4) A tile $t_o$, the root tile, exists for which blocks($t_o$)= {start,stop}.

Condition number (1) above provides a basis for hierarchical register allocation in accordance with the present invention. Conditions numbered (2) and (3) above identify places in the code where empty basic blocks may be inserted to allow the original endpoints to be further "apart" in the tile tree. Number (4) above constitutes a boundary condition.

Many different tile trees may be constructed from the same code. Loop structure alone may be used in constructing a tile tree. Alternatively and preferably, both loop structure and conditional structure are reflected in the tile tree. Some advantages of the inclusion of the conditional structure in tile trees to be processed in accordance with the present invention are reduction in interference graph size and improvement in spill code placement. Consequently, higher code execution efficiency is attainable through the use of fewer space/time resources.

A preferred method for tile tree construction is to begin with a tile graph corresponding to the control flow graph of the code, and group nodes in the tile graph together until a legal tile tree is formed in accordance with the conditions set forth above. Generally, construction of the tile tree commences with the portion(s) of the program having the potential for most frequent execution. A nested loop, for example, is potentially frequently executed. Tile tree construction proceeds to less frequently executed portions of the program, culminating in the once executed root tile.

This loop structure of the code is identified on the basis of intervals in the control flow graph as accomplished in prior art processes. An interval in the control flow graph is a set of basic blocks that form a loop in the code. Intervals, like tiles and loops, nest.

In a tile tree construction process useful in the practice of the present invention, a "loop top" is defined as the single basic block having incoming back edges that dominates every basic block in its loop. Irreducible loops do not exhibit a loop top; however, all basic blocks in an irreducible loop that are reached by a forward control flow edge from a basic block outside the loop can be combined into a single summary loop top in constructing the tile tree. This summary node will dominate every basic block in the loop. Similarly for loops with multiple exits, a summary exit node is added, so that each node in the interval will be post-dominated by a node in the interval. Each interval, thus defined, constitutes a the satisfying the conditions set forth above.

This interval structure may be used as a tile tree. Further capture of the control structure of the code within each interval is possible and preferable, however. For each interval I, a graph $G_I$=($N_I$,$E_I$) may be formed. Each interval strictly contained in I is represented by a single node in $N_I$, and each block in I not in a subinterval is represented by a node in $N_I$. Edges $E_I$ are induced by control flow edges between blocks in I as if blocks in subintervals were coalesced together. Self-loops and interval exit edges are ignored.

Equivalent classes of nodes in each $G_I$ are totally ordered by both dominator and post-dominator relations: for $S_i$={$n_1$, . . . , $n_k$}, $n_j$ dominates and is post-dominated by $n_{j+1}$, assuming a variable both dominates and post-dominates itself. From each $S_i$, $S_i$* is constructed by including any node dominated by a node in $S_i$ and post-dominated by a node in $S_i$. Each of the sets $S_i$* constitutes a tile.

Since conflict graphs may have O($n^2$) edges for n variables, control of the size of blocks(t) and the number of subtiles of t is preferred. One way to accomplish this is to break apart large tiles. For example, a large $S_i$ may be partitioned into disjoint pieces, where all nodes in one piece dominate those in another. A tile can, however, be broken into arbitrary connected components if no natural partition exists.

Once an initial set of tiles has been defined, empty basic blocks are added where edges violate condition number 2 or 3 above, thereby forming a tile tree. These basic blocks may be added by implementing the following:

--- define t(n) to be the smallest tile which
contains block n.
foreach edge e = (n,m) do

```
            if n∉t(m) and m∉t(n) then
                let a be the smallest
                tile containing both n
                and m
                create a block n_a in a and
                in all tiles containing a
                replace e with (n,n_a) and
                (n_a,m)
            endif
        endfor
        while ∃e = (n,m) where m∉ parent(t(n)) do
            create n' in parent(t(n)) and all
            containing tiles
            replace e with (n,n')
            and (n',m)
        endwhile
        while ∃e = (m,n) where m∉ parent(t(n)) do
            create m' in parent(t(n)) and all
            containing tiles
            replace e with (n,m') and (m',m)
        endwhile
```

The first loop in the code locates edges that cross between sibling tiles and introduces an empty block in the smallest containing tile. The next two loops identify edges that cross from a tile to a containing the which is not the parent tile. Each such edge is "shortened" by adding an empty block in the parent tile and replacing the invalid edge with an edge to the parent block and an edge from the parent block to the other endpoint. The former of these new edges satisfies restriction number 2 above, and the latter is "shorter" than the original edge, so that the process terminates.

Execution time for generating a tile tree is $O(\|E\| \times h(T))$, where $h(T)$ is the height of the tile tree (i.e., the length of the longest chain of tiles totally ordered by subset inclusion. Execution time for finding intervals is $O(\|E\|+\|N\|)$, and the execution time for finding tiles within intervals is dominated by the time to compute the dominator relation, $O(\|E\| \log \|N\|)$.

Alternative code to accomplish these functions is, of course, useful in the practice of the present invention. A practitioner in the art would be capable of writing and implementing code to define tiles and generate a tile tree in accordance with the principles embodied in conditions number 1 through 4 above, insuring that conditions number 2 and 3 above are satisfied by the edges in the tile tree.

FIG. 1a schematically depicts program code having a start block, a stop block and four basic blocks, B1, B2, B3 and B4. Block B1 represents a portion of the program code defining the variables g1 and g2. Block B2 uses variable g1 and defines new variable t1. Similarly, block B3 uses variable g2 and defines new variable t2. Block B4 uses variables g1 and g2.

Figure 1B:
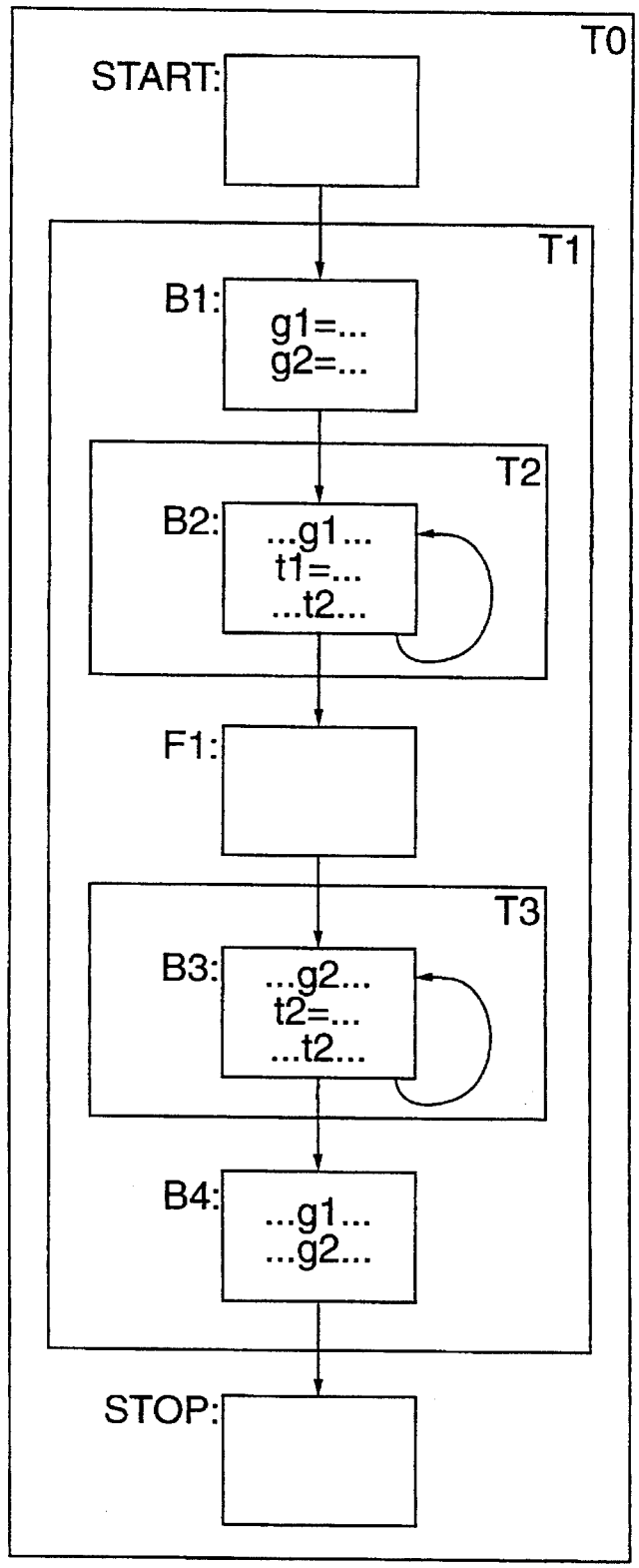
FIG. 1b is a schematic representation of a tile tree for the program code depicted in FIG. 1a to be compiled in accordance with the present invention.

FIG. 1b schematically depicts a tile tree resulting from the practice of the aforementioned process on the code depicted in FIG. 1a. This tile tree includes the tiles T0, T1, T2 and T3. Tiles T2 and T3 are sibling tiles located at the bottom of the tile tree. Tile T1 is the parent tile of both tiles T2 and T3. T0 is the root tile at the top of the tile tree. An empty block F1 is inserted between sibling tiles T2 and T3 to insure that the edges therebetween satisfy the conditions for a legal tile tree described above.

Both tiles T2 and T3 encompass a loop structure. T1 encompasses the definitions and usages of the variables g1 and g2. T0 represents the boundary condition. The structure of the tile tree, as shown in FIG. 1b, therefore reflects the structure of the program code under analysis, depicted in FIG. 1a.

An embodiment of the register allocation procedure of the present invention may be represented as follows:

```
phase1(tile t)
    foreach subtile s of t do
        phase1(s)
    endfor
    compute conflicts based on references
    in blocks(t)
    add preferences based on references in
    blocks(t)
    foreach subtile s of t do
        incorporate s's tile summary
        variable conflicts
        foreach variable g global in s that
        is also in a register in s do
            incorporate g's
            conflicts
        endfor
        add preferences from s
    endfor
    color tile interference graph
    update spill information
    save conflict and preference information
    for parent(t)
phase2(tile t)
    reconstruct interference from
        global variables and tile
        summary variables
    include global variables in registers
    in parent(t)
    set preferences based on
    allocation in parent(t)
    color interference graph using
    physical registers
    save allocation for each subtile s
    of t
    for each subtile s of t do
        phase2(s)
    endfor
```

Figure 2A:
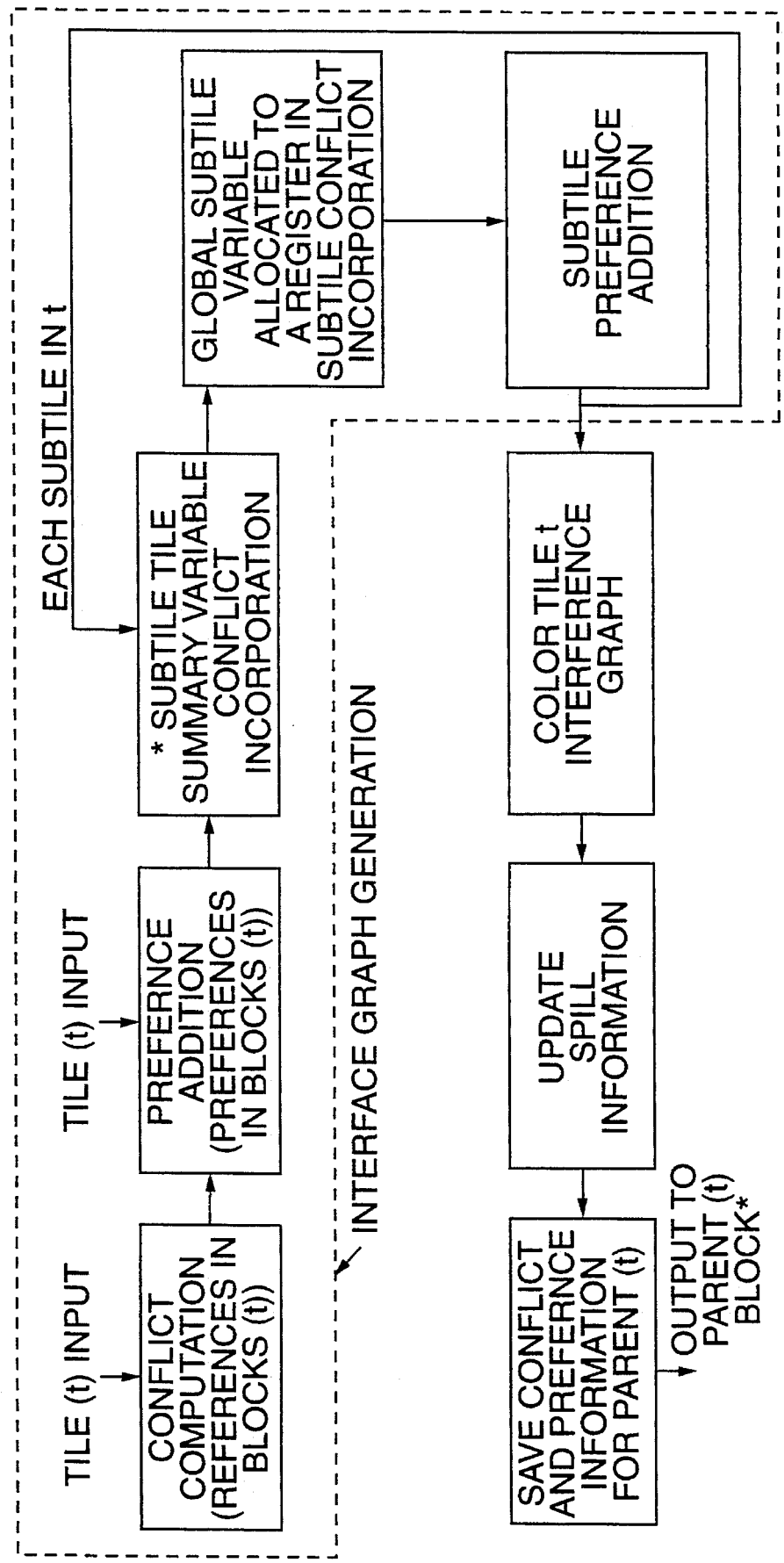
FIGS. 2a and 2b are schematic representations of the two phases of a register allocation method of the present invention, with FIG. 2a representing the first, bottom-up phase and FIG. 2b representing the second, top-down phase.
Figure 2B:
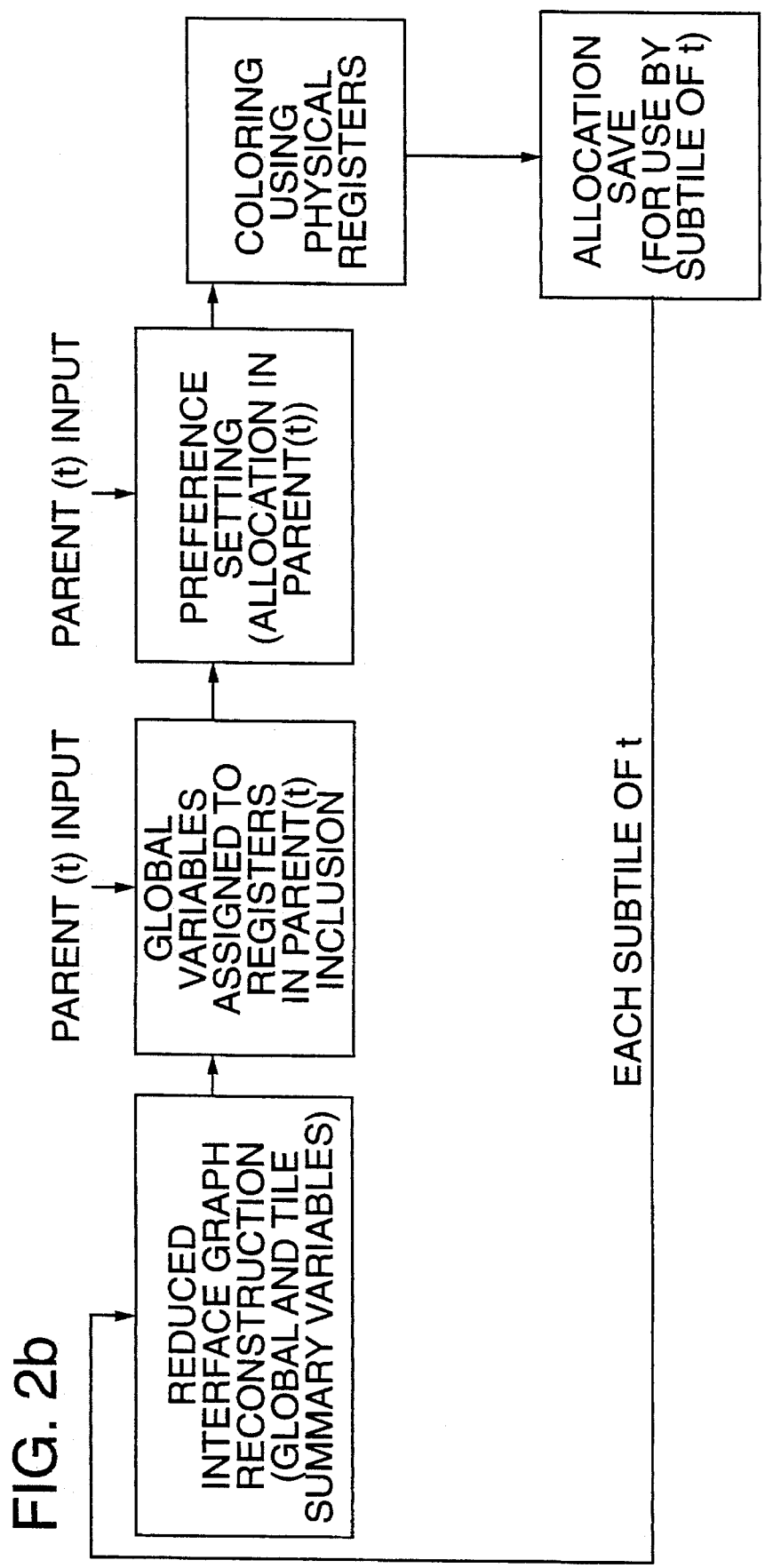

FIGS. 2a and 2b constitute flow diagrams representing the allocation procedure of the present invention for an individual tile, with FIG. 2a depicting the bottom-up phase and FIG. 2b depicting the top-down phase.

As shown in FIG. 2a, a tile interference graph is constructed and colored for a tile at the bottom of the tile tree representing a potentially highly executed code portion (i.e., pseudo registers are assigned). For example, the T2 or T3 would be processed first (or concurrently) in the tile tree shown in FIG. 1b. The results of this coloring are summarized, saved and communicated as interference graph construction proceeds up the tile tree, culminating in the once executed root tile.

As indicated in the first block of FIG. 2a, preparation of a tile interference graph commences with an evaluation of each variable in a leaf tile to identify conflicting variables, using information gleaned from the blocks in that tile only. More specifically, no subtile information is evaluated during the preparation of an interference graph for any leaf tile, i.e., the functions of the third, fourth and fifth blocks in FIG. 2a are not performed for leaf tiles.

The second block of FIG. 2a indicates that preference information, as discussed below, for the currently processed tile only is identified and incorporated along with the conflicts data into the tile interference graph. The initial tile interference graph is colored, as indicated in the sixth block of FIG. 2a. At this time, each variable in the tile is assigned to a pseudo register or spilled to memory. This information is summarized and serves as input for interference graph generation with respect to a parent tile, as indicated in the last block of FIG. 2a. Specifically, subtile tile summary variable conflicts information (the third block in FIG. 2a), conflicts involving global variables assigned to a register in the subtile (the fourth block in FIG. 2a) and subtile preferences (the fifth block in FIG. 2a) are incorporated into the tile interference graph of a parent tile.

To decrease interference graph size, pseudo register allocation of variables local to each child tile is summarized with a set of tile summary variables, with each tile summary variable corresponding to the set of local variables assigned to a single pseudo register. The savings in graph size arises, because a global variable that is live across a tile generally conflicts with all of the local variables within a tile. Such conflicts are more compactly represented as conflicts with tile summary variables that, in turn, represent a set of local variables.

For example, consider the following:
C=   ;
FOR each...DO
    A=   ;
    =A;
    B=   ;
    =B;
endfor
=C.

The loop containing definitions and uses of variables A and B constitutes a tile T1. A tile T2, the parent tile of T1, includes the definition and use of variable C. Variables A and B are local to T1, and variable C is local with respect to T2. A and B do not conflict, because B is not defined until after the last use of A. A and B may therefore be assigned the same color (to the same pseudo register). The tile summary variable for T1 will include local variables A and B, and only one tile summary variable will be carried forward in the practice of the present invention. Global variable C conflicts with both A and B, because C is live across T1. This conflict is represented as one conflict between C and the T1 the summary variable incorporating A and B.

The number of the summary variables for any tile is bounded by the number of physical registers. Conflicts among tile summary variables may be represented with a small bit matrix.

For each global variable that is assigned to a register in a tile, two sets of conflicting variables are retained. The first set of variables includes the local variables of the tile that conflict with the global variable and may be represented as follows:

$$c_t(g) = \{ts_t(v) | v \in L_t \text{ and } X(v,g)\}$$

In this equation, t represents a specific tile; v represents a local variable; g represents the global variable under consideration; $ts_t(v)$ represents a tile summary variable associated with variable v; $L_t$ represents the set of variables local to tile t; and $X(v_1, v_2)$ is the relation that $v_1$ and $v_2$ conflict. The second set of register-assigned global variable conflicts involves other register-assigned global variables in the tile.

The number of global variables that may be in registers at an entry or exit point of a tile is limited by the number of physical registers, R. Consequently, the total amount of information in the tile summary is $O((x_t \times ||R||)^2)$, where $x_t$ is the number of blocks that are destinations of entry edges to the tile or sources of exit edges from the tile. For structured programs, $x_t$ is 2.

For most tiles, two types of variables constitute the nodes of the interference graph, variables referenced in the tile and subtile tile summary variables. Inclusion of these two types of variables reflects the principle that variables that are live across a tile, but not referenced therein, are least deserving of a register in that tile. Consequently, such variables also do not need to be represented as a node in the interference graph of that tile during the first phase. Omitting unreferenced live variables contributes to the reduced interference graph size advantage of the present invention. Variable C in the previous example constitutes a case in point.

An interference graph for a parent tile is generated incorporating the information indicated in the first through fifth blocks of FIG. 2a. After this parent tile interference graph is colored, spill decisions may be updated in accordance with the parent tile/subtile information, as indicated by the penultimate block in FIG. 2a.

Interference graphs represent conflicts between variables. Such conflicts arise in a variety of situations, such as the following:

(1) Two variables may conflict in a block in blocks(t), as indicated, for example, in the preparation of the initial interference graph (the first block in FIG. 2a) during which subtile information is ignored;

(2) A variable may conflict with a tile summary variable or other global variables, as indicated in the conflict summaries for each subtile (the third and fourth blocks in FIG. 2a);

(3) A variable that is live across a subtile but not a part of the subtile allocation summary conflicts with all subtile tile summary variables; and (4) Tile summary variables of the same subtile conflict based on the saved conflict information, but tile summary variables of sibling tiles do not.

Preferencing information, referred to in the second (for tile t) and fifth (subtiles of t) blocks of FIG. 2a, indicates the preferability of certain allocations of variables to registers. Preferencing is an alternative to the prior art process of coalescing. In contrast to coalescing, preferencing permits variables to retain their separate identity throughout the allocation process. In this manner, more natural spill decisions are possible. Examples of preferencing situations follow:

(1) If one variable is used as a procedure call argument or result, and a linkage convention requires the argument or result to reside in a particular physical register, the variable becomes preferenced to that physical register; or (2) If a simple assignment occurs between two variables (e.g., A=B), those variables are preferenced to each other.

Preferencing of type (1) above involves a preference between a variable and a specific register. In such situations, an optional local preference register is associated with the variable. A variable with a local preference is colored as follows: If the preferred register is available, the variable is assigned to that register; otherwise the preference is ignored.

Preferencing of type (2) above involves variable-to-variable preferencing, without a requirement for allocation of the preferenced variables to any specific register. This type of preferencing is used in an effort to avoid variable moves that are unnecessary. In these circumstances, each variable having a type (2) preference is added to a preference list of the other variable(s) involved. When one of the type (2) preferenced variables is colored, each variable on its preference list is given that color as its local preference.

In support of inter-tile preferencing and register targeting, certain rules are preferably implemented in the practice of the present invention. If a global variable is allocated to a physical register in a subtile, that register becomes the local preference for that variable in the parent tile. Preferences are thereby propagated up the tile tree, allowing earlier definitions of a variable to target a desirable location.

In addition, if two global variables are preferenced in a subtile and are allocated to the same pseudo register as a result, the pair is added to a list of variable pairs that should be preferenced in the parent tile. When the interference graph for the parent tile is constructed, the variables on this propagated preference list are preferenced to one another. In this manner, transfers and other fix-up code requirements are minimized.

Preferences between global variables and tile summary variables are also included. For example, if a local variable is preferenced to a global variable, and those variables are assigned the same color, a preference between the global variable and a tile summary variable that includes the preferenced local variable is indicated. Preferences between global variables and local variables associated with tile summary variables may therefore be resolved, without the necessity of retaining additional preference information.

Once an interference graph reflecting variable conflicts and preferences is constructed for a tile, it is colored using a standard heuristic. Specifically, all variables having less conflicts than target CPU physical registers are placed on a colorable stack along with their edges. Since the edges associated with those stacked variables are removed from the interference graph, additional variables with a number of conflicts less than the number of physical registers may be generated and placed on the colorable stack.

When only variables having a number of conflicts greater than the number of physical registers remain, spill analysis must be conducted. The remaining variables are prioritized, and the least valuable variable for allocation to a physical register is next placed on the colorable stack. If this variable placement generates additional variables having a number of conflicts less than the number of physical registers, these variables are placed on the colorable stack. These operations proceed until all of the variables have been stacked. No definite spill decisions have been made at this point.

Assignment of physical and pseudo registers begins when the colorable variable stack has been completely generated. A set of colors is maintained for physical and pseudo registers. This color set is initialized to contain the physical registers required by certain local variables. More specifically, certain variables must occupy particular physical registers for specified purposes, such as to satisfy linkage conventions. In these situations, the color for that physical register is allocated to the appropriate variable, during the first, bottom-up phase of the process of the present invention.

The coloring process then involves serial removal of variables from the colorable stack in conjunction with the assignment of a color from the pseudo register color set thereto. If a number of colors less than the number of physical registers have been assigned and the variable requires a new color, a pseudo register is selected and added to the set of used colors. The color assigned to a variable without a local preference differs from any color previously allocated to a conflicting variable or with the local preferences of still uncolored local variables. If no color of this type exists, a color that is distinct from those of previously colored conflicting variables is chosen. If no such color exists, the variable is considered spilled.

The local preference of a variable is honored if the preferred register is available when that variable is colored. A local preference will not be awarded if a higher priority conflicting variable (based on the order of the colorable stack) desires the preferenced register.

An exception to the general coloring rules is made for global variables that are live at the tile boundaries and the local variables preferenced to them. In an effort to minimize the constraints placed on global variables, it is preferable to assign a color different from any other color previously used. In other words, colors assigned to global variables are avoided when coloring local variables (except those local variables preferenced to the global variable). Since a summary of tile conflicts is maintained, binding of distinct local colors to the global color may be accomplished during the top-down phase if desirable.

If variables having a number of conflicts in excess of the number of physical registers are present, some of the variables in the colorable stack will not receive colors. As a result of the stacking procedure and spill analysis conducted in accordance with the present invention, however, the more important (e.g., more often used) variables are assigned colors and will therefore be allocated to registers before the less important variables.

Spill analysis in accordance with the present invention involves the issues of which variable(s) to spill and where to insert the spill code relating thereto. The decision with respect to which variable(s) to spill is made during the bottom-up phase of the process of the present invention. Spill code insertion is accomplished in the top-down phase.

The variables having a number of conflicts greater than the number of physical registers are evaluated to identify the variable with the lowest spill cost (i.e., the penalty of accessing this variable from memory).

The following formulas are preferably used during the bottom-up phase of the process of the present invention to determine which variables should be allocated to registers in a tile t, and whether a variable is not worth allocating to a register in tile t even if the parent tile is capable thereof. Assuming unit cost to load or store a variable, spill decisions may be made on the basis of the following:

$$\text{Local weight}_t(v) = \sum_b \text{Prob}(b) \cdot \text{Ref}_b(v)$$

$$\text{Transfer}_t(v) = \sum_e \text{Prob}(e) \cdot \text{Live}_e(v)$$

$$\text{Weight}_t(v) = \sum_s (\text{Reg}_s(v) - \text{Mem}_s(v)) + \text{Local weight}_t(v)$$

$$\text{Mem}_t(v) = \text{Mem?}_t(v) \cdot \text{Transfer}_t(v)$$

$$\text{Reg}_t(v) = \text{Reg?}_t(v) \cdot \min(\text{Transfer}_t(v), \text{Weight}_t(v))$$

where e ranges over entry and exit edges; b ranges over the blocks in blocks(t); and s ranges over the subtiles of tile t. $\text{Live}_e(v)$ is 1 if variable v is live along edge e and 0 otherwise. $\text{Ref}_b(v)$ is the number of references to variable v in block b. $\text{Reg?}_t(v)$ is 1 if variable v is allocated a register in tile t and 0 otherwise. Similarly $\text{Mem?}_t(v)$ is 1 if variable v is not allocated a register in tile t and 0 otherwise.

Local-weight$_t(v)$ corresponds to the value of keeping v in a register contributed by the blocks in tile t.

Transfer$_t(v)$ is the cost of spilling (and/or reloading) variable v on entry to and exit from tile t.

Weight$_t(v)$ is used to determine what variable should be spilled. This value is based upon the number of uses of the variable in tile t; the penalty of allocating the variable to memory in tile t, if that variable desires a register in some subtiles thereof; and the penalty of allocating a variable to a register in tile t, if that variable is spilled in some subtiles thereof. If there is a disincentive to allocate a variable to a register, Weight$_t(v)$ will have a negative value. Such a disincentive is present, for example, when the cost of spilling a variable back to memory in some subtiles outweighs the benefit of having that variable in a register for tile t and for the subtiles that favor register allocation of that variable.

For example, a variable that is defined in tile t but is spilled in all subtiles may not be worth allocating to a register in tile t, because the subtile spills to memory can be avoided if the variable is initially allocated in memory. If this disincentive to variable register allocation in tile t is large enough to overcome the benefit garnered by placing the variable in a register, even if the parent tile allocates the variable to a register, the variable should be placed in memory in tile t. More specifically, each variable satisfying the inequality $Transfer_t(v)+Weight_t(v)<0$ is not allocated to a register in tile t.

Tile summary variables have zero Local_weight, because no references to such variables are made in any block of tile t. The $Weight_t$ of the summary variables is therefore based upon other factors, such as value of the variables in the subtile and the cost of transferring a variable on all of the tile entry and exit edges. This transfer cost approximates the penalty of spilling and reloading conflicting variables that are live and in registers at the boundaries of the subtile.

$Reg_t(v)$ constitutes the penalty of having the parent tile allocate v to memory, if it is allocated to a register in tile t. This term therefore represents the lesser cost alternative selected from completing a transfer between memory and a register at the tile boundaries and changing the allocation of v to be in memory for tile t.

$Mem_t(v)$ constitutes the penalty of having the parent tile allocate v to a register, if tile t allocates it in memory. This term represents the cost of moving v between a register and memory around the tile t, because v remains in memory in tile t following the spill decision.

Variables that are spilled, other than those for which a disincentive to register allocation exists, are chosen for spill as a result of register pressure, with the choice based upon the local benefit of keeping the variable in a register and the allocation solution from the subtiles.

After all variables have been given color assignments or spilled, a tile conflict summary is generated for variables allocated to registers. This process then continues up the tile tree, until all tiles have been analyzed.

FIG. 1b illustrates a tile tree that could be analyzed for a two physical register processor in accordance with the bottom-up process of the present invention. This tile tree includes four variables, requiring spill decisions to be made. T1 defines variables g1 and g2. The definitions of these variables are placed in the two available registers in T1. T2, a subtile of T1, includes two conflicting variables g1 and t1. T3, a subtile of T1 and a sibling of tile of T2, includes two conflicting variables g2 and t2.

Bottom-up processing in accordance with FIG. 2a may be accomplished by a practitioner in the art. Moreover, alternative, but essentially functionally equivalent processes may be implemented by such a practitioner. Bottom-up processing of the tile tree shown in FIG. 1b would involve the evaluation of tiles T2 and T3 followed by that of the parent tile T1.

To make the physical register assignments during the second, top-down portion of the process of the present invention shown in FIG. 2b, the tile interference graph is recreated from the summary information and is colored based on current preferences. At each typical tile t, a parent tile will have already placed certain global variables into registers and assigned some tile summary variables to registers. Also, other global variables and tile summary variables will have been spilled to memory. During bottom-up processing, global variables that were not referenced in tile t or a subtile thereof were ignored. Such variables that also received registers in a parent tile and are live across the tile t are now included in the analysis. These variables conflict with every other variable in the interference graph and are preferenced to the physical register they received in the parent tile.

Variables with physical preferences are assigned to those physical registers. Global variables assigned to a register in a parent tile are assigned to those registers in tile t, if there is no physical local preference with respect thereto.

FIG. 2b represents the second, top-down phase of the process of the present invention. The first block of FIG. 2b indicates that the interference graph is reconstructed for each tile t to include the register allocations made in the parent tile regarding global variables referenced in tile t and the tile summary variables for t. Information regarding global variables that were assigned to registers in a parent tile of tile t and are live across t is included in the interference graph, as indicated in the second block of FIG. 2b. Variable-register preferences that are based upon allocations made in a parent tile of tile t are then incorporated in the interference graph in accordance with the third block in FIG. 2b. As indicated in the fourth block of FIG. 2b, the reconstructed and augmented interference graph is colored using physical registers. This process constitutes the mapping of pseudo registers to physical registers. Finally, as indicated by the fifth block in FIG. 2b, the variable-register and variable-memory allocations made in tile t are saved for use in processing subtiles of tile t in the above described manner.

Once the final coloring for a tile t is known, insertion of spill code may be required. There are four basic situations that may occur. Specifically, a spill to memory, a transfer between registers, a reload from memory or no change may take place at the entry or exit edges. A spill is generally necessary when an edge, e=(a,b), exists where a variable is allocated to a register in the tile associated with block a and to memory in the tile associated with block b. A transfer is generally required when an edge, e=(a,b), exists, where a variable is assigned to a register in the tile associated with block a and to a different register in the tile associated with block b. A reload is generally necessary when an edge, e=(a,b), exists where a variable is allocated to memory in the tile associated with block a and to a register in the tile associated with block b, and it is cost effective to reload the variable in the subtile.

Code is inserted on an edge through the creation of a new basic block which is executed only when the edge is traversed. Spill code is placed in this block. The code added on tile entry and exit edges must be ordered, such that stores and moves from a register precede loads and moves to a register. It is possible for a cycle of register-to-register moves to exist, permuting the contents of a set of registers. In this case, an idle register is used to break the cycle. In some circumstances, a register will have to be spilled to provide an idle register for this purpose.

If v is in memory in tile t and in a register in a parent tile thereof, for example, code is preferably inserted to move v to and from memory on the edges of tile t. This is because spill decisions are never undone. If the parent tile found it profitable to place v in a register, there were enough uses of v to overcome the disincentive represented by the cost of transferring v to memory around tile t.

The formulas set forth above for determining which variables are to be spilled are also used in the second, top-down phase of the process of the present invention to determine when the register allocation of a variable in a tile should be changed to a memory allocation, because the variable is allocated in memory in a parent tile. If v is in a register in tile t and in memory in a parent tile thereof, and if $Weight_t(v)>Transfer_t(v)$, for example, memory to register transfers are conducted. Otherwise, the allocation of v in tile t is changed to a memory allocation.

Some efficiencies with respect to spills and reloads may be achieved in the practice of the present invention. Consider the situation when a definition of a variable V occurs prior to a loop, some uses of V occur inside the loop, and another use of V occurs after the loop. This situation may be represented as follows:

```
V=     ;
FOR each . . . DO
    X = V+Y;
    Z = V+X;
endfor
A = V–Z.
```

After physical register allocation, variable V may be assigned a register for the tile associated with the loop, but not allocated to a register outside the loop. Proceeding in strict accordance with the spill, reload, transfer, no change options as described above, a reload of V would be conducted at the loop entry edge, and a spill of V would occur at the loop exit. This spill is unnecessary, because V was used, but never modified, in the loop. The correct value for variable V is therefore already in memory. A simple method for recognizing this efficiency is to mark each tile where a variable is defined and pass that information up the tile tree. Similarly, a variable is reloaded only if there is a register definition of the variable further down in the tile tree and no spill of that variable has occurred since the definition.

The best place for spill code insertion may not be at the entry edge of the tile where the decision to spill the variable is made. As a result, information necessary to make the spill decision is determined on the way up the tile tree, and spill code insertion is made on the walk back down the tree.

To properly determine spill locations for variables, each variable that may be profitably spilled higher or lower in the tile tree is tracked in the subtiles. Every variable is not tracked; however, since the only variables that may be profitably spilled higher in the tree are those variables that have already been spilled or global variables referenced in the subtree (i.e., tile t and the subtiles thereof) and visible to a parent tile. Local variables will never be spilled higher in the tree because they are not live.

For example, consider a variable v that is used inside a deeply nested conditional code portion that is rarely executed. There may not be enough register pressure to cause the variable to spill until higher in the tile tree, but the point higher in the tree is executed more frequently than the conditional where the variable is used. Under these circumstances, it is desirable to spill the variable lower in the tile tree than is necessary in order to minimize the execution frequency of the spill code.

In contrast, a situation involving a pair of nested loops and a variable v that cannot be allocated a register for the inner loop (represented by the t) is resolved differently. It is possible to spill the variable inside of the outer loop, corresponding to spilling along the entry and exit edges of tile t. If no references to v are made in the outer loop, however, it is better to spill the variable outside of the outer loop in a tile higher in the tree. In this manner, the spill code may be inserted outside an iterative loop to minimize spill code execution frequency.

Top-down processing in accordance with FIG. 2b may be accomplished by a practitioner in the art. Moreover, alternative but substantially functionally equivalent processes, may be implemented by such a practitioner. Top-down processing of the tile tree shown in FIG. 1b would result in a decision to spill variable g2 prior to tile T2. At the entry edge of tile T3, a spill to memory of variable g1 must precede a reload of variable g2. After tile T3, g1 must be reloaded to accommodate the use of that variable in tile T1. Local variables t1 and t2 go dead before the exit edges of tiles T2 and T3 are traversed.

Profiling information can be easily incorporated to improve the selection of spilled variables and the location of the spill code in the practice of the present invention. This simplicity exists, because cost analysis is based on the probability of executing a particular basic block or flowing along a particular control flow edge, and profile data provides accurate probabilities.

Profiling information describes actual code execution. Specifically, the actual number of times loops are executed and the ratio at which the branches of conditional statements are executed are examples of profiling information. A code profile, if accurate, can improve the decisions regarding which variables to spill and spill code insertion locations in the practice of the present invention. With accurate profile data, more accurate $Weight_t(v)$ values can be ascertained to determine with greater particularity which variables would benefit the most from allocation to a register.

In operation, the code is compiled and profiling information is gathered. This information is then used in estimating $Weight_t(v)$ values used to allocate variables contained in the code between physical registers and memory. As can be readily appreciated, the benefit of using profiling information is directly proportional to how closely the profiling run approaches actual code execution. For example, if the profiling data indicates that one branch of a conditional statement is executed 90% of the time and actual code execution follows this pattern, the variables in the more frequently executed portion of the program will be given greater $Weight_t(v)$ values in the practice of the present invention. As the $Weight_t(v)$ value for a variable increases, so does the likelihood that it will be allocated to a register. If actual code execution does not comport with the profiling data, however, the register allocation of the present invention will be improperly biased, and the code will therefore be executed less efficiently.

The process of the present invention may be used to compile code in any higher level programming language, including, for example, Fortran, C, Ada, PL/I, Basic, COBOL, LISP or the like. Any type of user-generated or machine-generated program may be processed in accordance with the present invention. A person skilled in the art would be able to implement the process of the present invention to achieve the compilation of code written in higher programming languages.

The process of the present invention may be used to provide machine readable code to a target CPU, with registers such as IBM 360, VAX, MIPS R2000, SPARC, IBM 370, Motorola 68000, MIPS R3000, Intel 80386 or the like. One skilled in the art would be able to implement the present invention to provide machine readable code to a target CPU.

Specific uses of the present invention are described below. A practitioner in the art would appreciate and be able to implement many other applications of the present invention.

When a variable corresponding to a machine instruction operand is spilled, some provision must be made to deliver the value of that variable to the CPU. As discussed previously, most modern processor designs allow such operands to come from registers only. A register must therefore be made available to hold the value immediately before use of the operand. This situation is handled in the practice of the present invention by introducing a temporary variable for each such operand, with these temporary variables designated as local variables with infinite $Weight_t(v)$. The temporary variable is also preferenced to the operand, so that every load of the operand is modelled as a load into the temporary variable. Since the temporary variables exist in only one tile, and no tile contains a large number of them, they do not contribute significantly to allocation cost.

Another anomaly in register allocation is handling procedure calls. A linkage convention may specify that particular registers should be saved by the caller, saved by the callee, used as parameters, or used to return a value. The various conventions for handling registers at call sites and procedure entry and exit can be handled uniformly with the process of the present invention. Parameter passing and return values are handled with preferencing. Spilling caller-save variables is treated by introducing a local variable with infinite Weight$_l$(v) and a preference to a physical register at the point of the call. Handling callee-save registers is analogous to spilling variables corresponding to the callee-saved registers that are live across the entire procedure but not referenced anywhere in the procedure. When processing the root tile, each callee-save register is assumed to contain a live variable, with a Weight$_l$(v) commensurate with the save and restore cost and a preference to the callee-save register. This variable competes with other variables during the spill analysis.

For example, a code segment may first conduct a quick return check and then a large amount of computation. The bulk of the computation will occur in subtiles with lower execution frequency than the root tile. In this case, the cost analysis indicates that subtile tile summary variables should be spilled in the root tile, rather than the variables occupying callee-save registers. The net effect is that a callee-save register is not saved until an execution path which actually requires the register is selected.

Inline expansion may also be handled in accordance with the present invention. Inline expansion is the replacement of a function call with a copy of the body of the function, a strategy used to reduce the overhead of function calls and to allow more effective optimization in the vicinity of the function call. Inline expansion can have a detrimental effect on traditional register allocators, since a natural spill point (the call site) has been removed. In contrast, the present invention retains natural spill points, such as loop boundaries and nested control. Further, since all of the local variables of the inlined-function will be local to the tile encompassing the function, the cost of coloring after inline expansion should be proportional to the combined cost of coloring functions separately.

Some machines have more levels of programmer addressable memory hierarchy than just registers and main memory. The present invention can handle such hierarchy by moving variables between one hierarchical level and another at tile boundaries. Under these conditions, allocation entails placing the variable at the highest level where it can be allocated and utilizing spill analysis to eliminate unprofitable moves between levels.

The present invention also provides an efficient register allocation scheme capable of executing in parallel. Sibling subtrees can be processed concurrently in both the bottom-up and top-down portions of the present invention. The amount of parallelism of a code segment depends on the shape of the tile tree. A tile tree of adequate breadth exhibits sufficient parallelism to benefit from parallel register allocation conducted in accordance with the present invention.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

What is claimed is:

1. A computer-implemented method for allocating variables among physical registers of a target computer during conversion of a higher level code portion to a form readable by the target computer, comprising the steps of:

generating a hierarchical tile tree corresponding to an underlying control structure of the code portion and including a root tile having a first code block with no predecessor and a second code block with no successor and a set of basic tiles corresponding to at least one of loop control structures and conditional control structures, the root tile being hierarchically superior to the basic tiles and at least a first one of the basic tiles being hierarchically superior to at least a second one of the basic tiles;

determining variable usage within the tiles beginning with hierarchically inferior tiles and proceeding to hierarchically superior tiles, the variable usage for hierarchically superior tiles including summary variable usage of hierarchically inferior tiles;

assigning variables to a number of pseudo registers based upon the variable usage within the tile for each tile, the number of pseudo registers being limited by the number of physical registers;

determining variable usage within the code section for each tile beginning with hierarchically superior tiles and proceeding to hierarchically inferior tiles, the variable usage for hierarchically inferior tiles including variable usage of hierarchically superior tiles; and binding the pseudo registers to the physical registers such that conflicts between variables used within a tile and variables used in the code section outside of the tile are resolved to reduce variable usage costs within the entire code section.

2. A variable allocation method according to claim 1 further including the step of inserting spill code at a location in the code portion which minimizes spill code execution frequency.

3. A variable allocation method according to claim 1 wherein the assigning and binding steps are conducted in accordance with local weights based on estimates of the number of references to variables in the code portion.

4. A variable allocation method according to claim 1, where the assigning and binding steps are conducted using profiling information to achieve variable allocation enhancement.

5. A variable allocation method according to claim 1 wherein two code portions represented by separate tiles in the hierarchical tile tree may be processed simultaneously.

6. A variable allocation method according to claim 5 wherein the separate tiles representing the two code portions are at the same level in the hierarchical tile tree.

7. A variable allocation method according to claim 1 wherein the assigning step comprises generating a plurality of local interference graphs, each graph corresponding to a tile in the hierarchical tile tree, thereby decreasing resource requirements for implementation of the method.

8. A variable allocation method according to claim 7, wherein the interference graph for each tile comprises variables local to the tile, global variables accessed within the tile and a set of tile summary variables for each child tile of the tile.

9. A variable allocation method according to claim 1 further comprising the step of using one or more temporary registers to deliver one or more operands of target computer instructions to achieve variable allocation without iteration of the allocation method.

10. A variable allocation method according to claim 1, which further comprises the step of preferencing two or more variables to the same register without permanently binding the variables together so that the variables cannot undergo further processing separately.

11. A variable allocation method according to claim 10 wherein preferencing information is propagated up the hierarchical tile tree during the assignment step.

12. A variable allocation method according to claim 10 wherein the code portion includes an assignment between the variables to be preferenced.

13. A variable allocation method according to claim 1 further comprising the step of preferencing a variable to a physical register in which the variable is required to be resident.

14. A variable allocation method according to claim 13 wherein the variable is allocated to the required physical register during the assignment step.

15. A variable allocation method according to claim 1 in which tiles in the hierarchical tile tree are in levels that have a parent and child relationship wherein a register to memory transfer of a variable between a parent tile and a child tile is conducted only if it results in fewer total register to memory variable transfers when the code portion is compiled.

16. A variable allocation method according to claim 1 in which tiles in the hierarchical tile tree are in levels that have a parent and child relationship wherein a register to memory transfer of a variable between a parent tile and a child tile is not conducted at an exit edge of the child tile if the variable is used but not modified in the child tile.

17. A variable allocation method according to claim 1 further including the step of inserting spill code at a location other than at an entry or exit edge of the tile for which a decision to spill a variable has been made.

18. A variable allocation method according to claim 17 wherein spill code to achieve a memory to register transfer of a variable is inserted at a lower level in the hierarchical tile tree than dictated by register pressure to minimize an execution frequency of the spill code.

19. A variable allocation method according to claim 17 wherein spill code to achieve a register to memory transfer of a variable is inserted at a higher level in the hierarchical tile tree than dictated by register pressure, because the variable is not allocable to a register lower in the hierarchical tile tree and benefit garnered by having the variable in a register higher in the tile tree is not great.

20. The method of claim 1 in which the local variable usage is determined by scanning the hierarchical tile tree in a bottom-up direction starting with a leaf tile which is hierarchically superior to no other tile, and the global variable usage is determined by scanning the hierarchical tile tree in a top-down direction starting with the root tile.

21. The method of claim 1 in which determining variable usage within the tiles includes determining a first interference graph for variables within each tile and in which determining variable usage within the code section includes determining a second interference graph for variables in each tile.

22. The method of claim 1 in which the program code can be represented by a control flow graph, $G=(B,E)$, where $B$ represents a set of basic code blocks, $E$ represents a set of control flow edges between elements of $B$, and in which generating a tile tree includes generating a tile tree, $T$, defined as a collection of sets of basic blocks encompassing the entire set $B$ in which each element of $T$, $t$, defined as a tile, meets the following requirements:

(1) each pair of sets $t$ in $T$ are either disjoint or one is a proper subset of the other and if $t_2 \in t_1$ and there is no $t \in T$ such that $t_2 \in t \in t_1$, then $t_2$ is a child tile or subtile of $t_1$ and $t_1$ is the parent tile of $t_2$, denoted $t_1 = \text{parent}(t_2)$, the set blocks(t) being defined to be the set of basic blocks that are members of $t$ but are not members of any child of $t$;

(2) for each edge $e=(n,m) \in E$ and tile $t$ such that $m \in t$, either $n \in t$ or $n \in$ blocks(parent(t)); and (3) For each edge $e=(m,n) \in E$ and tile $t$ such that $m \in t$, either $n \in t$ or $n \in$ blocks(parent(t)).

23. The method of claim 1 in which determining variable usage within the code section includes creating an interference graph that includes global variables that are live, but not used, within the tile.

24. A computer-implemented method for allocating variables among physical registers and a separate memory of a target computer during conversion of a higher level code portion to a form readable by the target computer, comprising the steps of:

generating a hierarchical tile tree that corresponds to an underlying control structure of the code portion and including a root the having a first code block with no predecessor and a second code block with no successor and a set of basic tiles corresponding to at least one of loop control structures and conditional control structures, the root tile being hierarchically superior to the basic tiles and at least a first one of the basic tiles being hierarchically superior to at least a second one of the basic tiles;

determining variable usage within tiles for the tiles beginning with hierarchically inferior tiles and proceeding to hierarchically superior tiles, the variable usage within tiles for hierarchically superior tiles including summary variable usage of hierarchically inferior tiles;

determining variable usage globally within the code portion for the tiles beginning with hierarchically superior tiles and proceeding to hierarchically inferior tiles, the variable usage for hierarchically inferior tiles including variable usage of hierarchically superior tiles;

allocating variables to physical registers response to the vocal variable usage and the global variable such that conflicts among variables within individual tiles and variables used in the code portion outside the tile are resolved to reduce variable usage costs; and inserting code to spill to the memory variables not allocated to physical registers.

25. The method of claim 24 in which the underlying control structure of the code portion includes a conditional structure, and the method further comprises the step of inserting spill code inside the conditional structure.

26. The method of claim 24 in which spill code is inserted after determining variable usage globally within the code portion and allocating variables to physical registers.

27. A computer-implemented method for allocating variables among physical registers of a target computer during conversion of a higher level code portion to a form readable by the target computer, comprising the steps of:

generating a hierarchical tile tree corresponding to an underlying control structure of the code portion, the hierarchical tile tree defining parent-child relationships among the tiles;

determining during a first phase variable usage within the tiles beginning with hierarchically inferior tiles and proceeding to hierarchically superior tiles, the variable usage within the tiles being determined by:

constructing and coloring a tile interference graph to identify conflicts within each leaf tile, the interference graphs incorporating preference information;

assigning in accordance with the interference graph coloring variables to pseudo registers and tentatively designating variables that cannot be assigned to pseudo registers to spill, the number of pseudo registers being limited by the number of physical registers;

constructing and coloring tile interference graphs to identify conflicts within hierarchically superior tiles and, for each hierarchically superior tile, designating variables to be assigned to pseudo registers or to be spilled, the designation determined by the variable usage within each hierarchically superior tile and within its child tiles, the interference graph for each hierarchically superior tile incorporating preference information and tile summary variables from its child tiles, the number of summary variables being limited by the number of pseudo registers;

determining in a second phase variable usage within the code section beginning with hierarchically superior tiles and proceeding to hierarchically inferior tiles, the variable usage within the tiles of the code section being determined by:

constructing and coloring tile interference graphs to identify conflicts within each hierarchically inferior tile and, for each hierarchically inferior tile, designating variables used within the tile or that are live across the tile to be assigned to physical registers or to be spilled, the designation determined by the variable usage within the tile and by the register allocation in the corresponding parent tile and the interference graph for each hierarchically inferior tile incorporating preference information from itself and its parent tiles;

inserting spill code at tile entry or exit edges if all variables cannot be assigned to physical registers, the assignment of variables to physical registers reducing variable usage costs within the entire code section.

28. The method of claim 27 in which each tile summary variable corresponds to a set of variables that are used within a child tile and that are assigned to the same pseudo register.

29. The method of claim 27 in which the interference graphs constructed in the first phase include variables referenced in the tile and in which the interference graphs constructed in the second phase include variables referenced in the tile and global variables that are live across the tile.

30. The method of claim 27 in which a linkage convention requires a procedure call or result to be stored in a specific register and in which a variable corresponding to the procedure call or result is preferenced to the specific physical register by assigning the variable to the register within the corresponding tile if the physical register is available.

31. The method of claim 27 in which variables that are related by a simple assignment statement are preferenced to each other by assigning to the variables the same color as their preference within the tile containing the assignment statement, thereby reducing variable moves between registers.

32. The method of claim 27 further comprising maintaining a summary of variable conflicts between tiles.

33. The method of claim 27 in which the spill code includes instructions to spill variables to memory, instructions to transfer variables between registers, or instructions to reload code from memory.

34. The method of claim 27 in which the spill code is inserted at an edge of a tile other than the tile at which the determination to spill the variable is made.

* * * * *

UNITED STATES PATENT AND TRADEMARK OFFICE
CERTIFICATE OF CORRECTION

PATENT NO. : 5,530,866              Page 1 of 2

DATED : June 25, 1996

INVENTOR(S) :

Brian D. Koblenz and Charles D. Callahan, II

It is certified that error appears in the above-indentified patent and that said Letters Patent is hereby corrected as shown below:

Column 5, line 38, change "the" to --tile--;

Column 6, line 9, change "the" to --tile--;

Column 6, line 23, change "child the" to --child tile--;

Column 7, line 21, change "the tree" to --tile tree--;

Column 7, lines 42-43, change "$t_2 \epsilon t_1$" to --$t_2 \subset t_1$-- and "$t_2 \epsilon t \epsilon t_1$" to --$t_2 \subset t \subset t_1$--;

Column 8, line 32, change "constitutes a the" to --constitutes a tile--;

Column 11, line 31, change "the T1 the" to --the T1 tile--;

Column 11, line 33, change "the summary" to --tile summary--;

Column 22, lines 6-7 of claim 22, change "$t_2 \epsilon t_1$" to --$t_2 \subset t_1$--, and "$t_2 \epsilon t \epsilon t_1$" to --$t_2 \subset t \subset t_1$--;

UNITED STATES PATENT AND TRADEMARK OFFICE
CERTIFICATE OF CORRECTION

PATENT NO. : 5,530,866
DATED : June 25, 1996
INVENTOR(S) : Brian D. Koblenz and Charles D. Callahan, II It is certified that error appears in the above-indentified patent and that said Letters Patent is hereby corrected as shown below:

Column 22, lines 46-47 of claim 24, delete "response to the vocal variable usage and the global variable".

Signed and Sealed this

Eighth Day of April, 1997

Attest:

BRUCE LEHMAN

Attesting Officer

Commissioner of Patents and Trademarks